UNITED STATES PATENT OFFICE.

JAMES H. STEBBINS, JR., OF NEW YORK, N. Y.

COLORING-MATTER OR DYE-STUFF.

SPECIFICATION forming part of Letters Patent No. 253,444, dated February 7, 1882.

Application filed December 31, 1881. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a blue dye-stuff which is produced by the action of dimethyl-paraphenylendiamine hydrochloride upon an alkaline solution of orthocresol (from coal-tar cresol) in the presence of an oxidizing agent, after which the coloring-matter is developed by means of common acetic acid.

In carrying out my invention I take ten pounds of nitroso-dimethylaniline hydrochloride and dissolve it in five hundred pounds of water. I then reduce it at a temperature of 50° centigrade, in the ordinary way, by means of zinc-dust, to dimethyl-paraphenylendiamine hydrochloride. This is then filtered in order to separate out the zinc-dust, and to the hot filtrate thus obtained I add, under constant stirring, a solution composed of orthocresol 10.8 pounds; bichromate of potash, eight pounds; caustic-soda solution, (1.29 specific gravity,) about twenty-five pounds; two hundred pounds of water. I then allow this mixture to cool, and when cold I add thereto, little by little and under constant stirring, common acetic acid till the previously-alkaline solution has become slightly acid, at which point the dye-stuff is thrown down as a copious dark-blue precipitate with bronze luster. This may be collected on a filter and slightly washed with cold water, when it is ready for use in the shape of a paste.

My new dye-stuff dissolves readily in alcohol and in hot water with a deep-blue color, and dyes wool mordanted with the usual alum or chrome mordants, at a temperature of about 150° Fahrenheit, with an indigo-extract-blue color.

Strong sulphuric acid dissolves a strongly-concentrated paste of my coloring-matter with a sage-blue color. This solution is rendered almost colorless by the addition of hot water. Zinc-dust changes the blue aqueous solution to pink, which, however, is again changed to blue by the oxygen of the air. Hydrochloric acid decolorizes the aqueous solution. On the other hand, potash does not change the color.

I do not wish to confine myself to the proportions of the ingredients herein set forth, as they may be changed without departing from the principle of my invention.

What I claim as new, and desire to secure by Letters Patent, is—

The blue dye-stuff produced by the action of dimethyl-paraphenylendiamine hydrochloride upon an alkaline solution of orthocresol in presence of an oxidizing agent, substantially as set forth.

In testimony whereof I have hereunto set my hand and seal in the presence of two subscribing witnesses.

JAMES H. STEBBINS, JR. [L. S.]

Witnesses:
J. VAN SANTVOORD,
E. F. KASTENHUBER.